United States Patent Office 2,978,464
Patented Apr. 4, 1961

2,978,464
EPOXIDATION OF CYCLODODECATRIENE PROCESS

Herbert K. Wiese, Cranford, and Samuel B. Lippincott, Springfield, N.J., assignors to Esso Research and Engineering Company, a corporation of Delaware No Drawing. Filed Mar. 2, 1959, Ser. No. 796,208

7 Claims. (Cl. 260—348)

The present invention relates to a new and improved process for the preparation of 9,10-epoxy-1,5-cyclododecadiene, 5,9-diepoxycyclododecene and 1,2-epoxycyclododecane. This invention relates also to the preparation of a new composition of matter, the diepoxide of cyclododecatriene, viz. 5,6-9,10-diepoxycyclododecene. More particularly the present invention relates to reacting cyclododecatriene or cyclododecene with aqueous hydrogen peroxide in the presence of catalytic amounts of formic and/or or halogenated acetic acids. Most particularly, this invention relates to reacting these materials at temperatures of 20 to 45° C. utilizing hydrogen peroxide in concentrations ranging from less than 5 to 50 wt. percent and utilizing 1 to 25 mole percent of the catalytic material.

The present invention process for the preparation of monoepoxides and diepoxides is unexpected in that from the prior art it would be believed that glycols rather than epoxides would be obtained by utilizing hydrogen peroxide in combination with formic acid for the oxidation. Thus, with this process over the prior art processes high yields of the desired product and a much more economical process are obtained. It should be noted that much less expensive materials than the perbenzoic acid or acetaldehyde peracetate oxidizing materials described in the prior art are used.

The 1,5,9-cyclododecatriene starting material of this invention is known in the art, being prepared by trimerizing butadiene with alkyl metal type catalysts, its preparation and description being described for example in Angewandte Chemie, v. 69, No. 11:397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the formulas below.

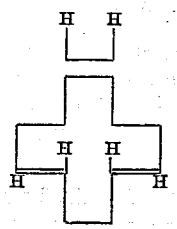

Cis., tr., tr.; M.P. −18° C

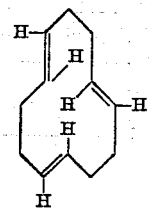

Tr., tr., tr.; M.P. 34° C.

Throughout this specification it will be assumed that either of the isomers above represented or of the other isomers may be utilized or mixtures thereof.

The epoxides produced according to the present invention are of great value as starting materials to be converted by hydrogenation to the alcohol and thence by oxidation to 1,12-dodecanedioic acid. This 1,12-dodecanedioic acid is of great value as a starting material in the manufacture of polyesters and of polyamides. The suitableness of this material as a Nylon 66 type intermediate for example, is obvious. Thus, Nylon 66 is obtained by the poly condensation of hexamethylene diamine with adipic acid and fiber materials made from higher molecular weight intermediates such as the present 1,12-dodecanedioic acid also have been prepared. They are now being evaluated for various commercial uses.

The diepoxide, 5,9-diepoxycyclododecene will be of particular value as a cross-linking agent to be used in various types of resins. Thus, since the epoxy groups are separated by two carbon atoms it is probable that they are of equal reactivity and that therefore efficient cross-linking will be obtained. Particularly, this compound will be of use as a cross-linking agent used in epoxy resins.

It is known that cyclododecatriene can be epoxidized to a monoepoxide using acetaldehyde peracetate. However, prior to the present invention the production of the diepoxide has not been described. According to the preferred method of preparation of the present invention small quantities of diepoxides as well as the monoepoxides are produced, however, the diepoxides have also been selectively produced (and then isolated) by the process of reacting 1,5,9-cyclododecatriene with perbenzoic acid prepared as described in "Organic Synthesis," Collective Volume 1, second edition. According to this method of preparation the solution of perbenzoic acid in chloroform is added to, for example, a solution of cis, trans, trans, 1,5,9-cyclododecatriene slowly with stirring and cooling at a temperature of 0° C. The mono- and diepoxides are separated from heavier boiling material by distillation. The diepoxide was found to boil at a temperature of 107° C. at 0.35 mm. pressure and analyzed as follows:

|  | Percent |
|---|---|
| Oxygen, theory | 16.47 |
| Oxygen found, direct | 16.5 |

It has now been found that an optimum production of the monoepoxide, and of the diepoxide, may be obtained using less expensive materials than the perbenzoic acid or acetaldehyde peracetate described in the prior art. This new process results in high yields of desired products and is cheaper than the processes mentioned above. It consists of contacting cyclododecatriene or cyclododecene with aqueous hydrogen peroxide in the presence of catalytic amounts of formic and/or halogenated acetic acids such as trichloro or trifluoro acetic acid. The hydrogen peroxide concentration may be in the range of 1 to 75 wt. percent preferably 5 to 35 wt. percent. Mole ratios of 100% hydrogen peroxide to cyclododecatriene may be in the range of 0.5 to 1 to 3 to 1, preferably 1 to 1 to 2 to 1. The formic acid and/ or halogenated acetic acids may be used in quantities ranging from about 0.5 to about 50 mole percent, preferably 1 to 25 mole percent based on 100% hydrogen peroxide. Reaction temperatures may be in the range of 5° C. to 100° C. The optimum temperature depends somewhat on the concentrations of hydrogen peroxide and catalysts. Thus, with hydrogen peroxide concentrations ranging between 5 to 50% by weight and containing 1 to 25 mole percent formic acid based on 100% hydrogen peroxide charged, temperatures between 20° C. and 45° C. are suitable.

The above reaction conditions will produce high yields of the monoepoxide. Where it is desired to produce larger yields of the diepoxide it is preferred to utilize mole ratios of 100% hydrogen peroxide to cyclododecatriene in the range of 2 to 1 to 5 to 1. Additionally mole percent formic acid or halogenated acetic acid to 100% hydrogen peroxide should be in the range of 0.5 to 5%. It should be noted that even utilizing these conditions yields of the diepoxide are still below the yields of the monoepoxide in the reaction products.

To obtain the saturated monoepoxide, 9,10-epoxy-1,5-cyclododecadiene is hydrogenated utilizing any of the conventional hydrogenation catalysts and suitable reaction conditions. It is preferred to utilize a platinum on alumina catalyst and mild conditions for hydrogenation.

The ranges of conditions given above are critical for the desired production of the epoxide. Where too large amounts of formic acid and/or of the halogenated acetic acids are used the epoxide ring breaks and glycols or their formic acid esters are formed. Thus, prior to the present it was expected that only glycols could be prepared by utilizing hydrogen peroxide in combination with formic acid. In Helv. Chim. Acta, 38, 1786 (1946), it was reported that when cyclododecene is reacted with a mixture consisting of 3.5 wt. percent hydrogen peroxide, 88 wt. percent formic acid and 28.5 wt. percent water that the formic acid ester of the glycol is formed. Although it is not intended to limit the present invention to any particular mechanism it may be speculated that in the present process the epoxide in combination with very small amounts of formic acid is so insoluble in the aqueous hydrogen peroxide phase that it does not hydrolize the epoxide to the glycol or ester. With a lower molecular weight olefin, of course, the solubility would be greater or with too much formic acid the amount of cyclododecatriene and/or epoxycyclododecadiene dissolved is increased which would result in hydrolysis of the epoxide.

The following Examples 1 and 2 present data obtained in the laboratory which help to define the present invention.

EXAMPLE 1

*Epoxidation of cyclododecatriene*

| Charge, Moles | Run 1 | Run 2 | Run 3 | Run 4 | Run 5 | Run 6 |
|---|---|---|---|---|---|---|
| 1,5,9-Cyclododecatriene (CDT) | 0.5 | 4.4 | 8.9 | 0.5 | 0.5 | 0.5 |
| Hydrogen Peroxide a | 1.0 | 8.7 | 17.8 | 1.0 | 1.0 | d 1.0 |
| Formic Acid | 0.0 | 2.0 | 2.0 | 0.19 | 0.6 | 0.6 |
| Mole Ratio Hydrogen Peroxide/Formic Acid | | 4.35 | 4.35 | 5.3 | 1.7 | 1.7 |
| Reaction Conditions: | | | | | | |
| Temperature, ° C | 25–40 | 25–40 | 25–40 | 25–40 | 25–40 | (e) |
| Contact Time (Hrs.) | 8.5 | 8 | 11 | 15 | 5 | |
| Recovered, Moles: | | | | | | |
| Unconverted CDT | 0.45 | 2.3 | 3.2 | 0.1 | 0.12 | |
| Monoepoxide b | trace | 1.6 | 4.8 | 0.32 | 0.17 | |
| Residue | trace | c 0.2 | c 0.5 | c 0.08 | c 0.11 | |
| Conversion, Mole Percent | trace | 41.5 | 59.5 | 81 | 70 | |
| Selectivity to Monoepoxide, Mole Percent | | 88.0 | 90.0 | 80 | 61 | | a Hydrogen peroxide used, 35% by weight in water.
b Boiling point 125 to 128° C. at 10 mm.
c Residue consists mostly of hydroxy esters and small amounts of the diepoxide.
d Hydrogen peroxide added as 50% solution.
e Reaction so vigorous it could not be controlled and material boiled out of reactor.

EXAMPLE 2

*Diepoxide preparation for identification purposes*

To a chilled solution of 174.5 gm. perbenzoic acid in 2600 ml. of chloroform there was added, with stirring, 102 g. of cyclododecatriene at such a rate that the temperature did not rise above 0° C. After standing overnight at room temperature the mixture was washed several times with 10% sodium hydroxide solution, then with water, and was dried with anhydrous sodium sulfate. The mixture was filtered and chloroform was removed by distillation at atmospheric pressure. Vacuum distillation resulted in three cuts as follows:

G.
Cut 1: 85° C. @ 0.4 mm. to 103° @ 0.35 mm. -- 11.6
Cut 2: 103° C. @ 0.35 mm. to 113° @ 0.35 mm. _ 56.2
Cut 3: Bottoms _____ 70

Cut 2, the desired diepoxide, was found by analysis to contain 15.7% oxygen. A heart cut, distilling at 107° C. @ 0.35 mm. contained 16.5% oxygen. The theory for the diepoxide, $C_{12}H_{18}O_2$, is 16.47% oxygen. The residue from the distillation was a brittle solid at room temperature. It is speculated that this residue probably comprises mainly benzoate esters derived from the reaction of the epoxide with the benzoic acid present in the reaction mixture, although some triepoxycyclododecane may also be present.

What is claimed is:
1. The new composition of matter 5,6-9,10-diepoxycyclododecene.
2. The process for preparing 9,10-epoxy-1,5-cyclododecadiene and 5,6-9,10-dipoxy cyclododecene which comprises reacting 1,5,9-cyclododecatriene at temperatures in the range of 5 to 100° C. with aqueous hydrogen peroxide having a concentration in the range of 1 to 75 wt. percent utilizing 0.5 to 1 to 5 to 1 moles of 100% hydrogen peroxide per mole of cyclododecatriene, and 0.5 to 50 mole percent based on 100% hydrogen peroxide of an acid selected from the group consisting of formic acid and halogenated acetic acids.
3. The process for preparing 9,10-epoxy-1,5-cyclododecadiene which comprises reacting 1,5,9-cyclododecatriene at temperatures in the range of 5 to 100° C. with aqueous hydrogen peroxide having a concentration in the range of 1 to 75 wt. percent utilizing 0.5 to 1 to 2 to 1 moles of 100% hydrogen peroxide per mole of cyclododecatriene, and 0.5 to 50 mole percent based on 100% hydrogen peroxide of an acid selected from the group consisting of formic acid and halogenated acetic acids.
4. The process of claim 3 in which the concentration of hydrogen peroxide is within the range of 5 to 35 wt. percent and the amount of acid utilized is within the range of 1 to 25 mole percent based on 100% hydrogen peroxide.
5. The process of claim 3 wherein the reaction temperatures are 20 to 45° C.
6. The process of claim 3 in which mole ratios of 100% hydrogen peroxide to cyclododecatriene are in the range of 1 to 1 to 2 to 1.
7. The process of claim 3 wherein the temperatures are within the range of 20° to 45° C. and wherein the concentration of the hydrogen peroxide is in the range of 5 to 50 wt. percent and wherein the amount of formic acid is 1 to 25 mole percent based on 100% hydrogen peroxide.

References Cited in the file of this patent

UNITED STATES PATENTS

| | | |
|---|---|---|
| 2,543,419 | Niederhauser | Feb. 27, 1951 |
| 2,813,896 | Krimm | Nov. 19, 1957 |
| 2,845,442 | Pachaly et al. | July 29, 1958 |
| 2,873,283 | Yang | Feb. 10, 1959 |

FOREIGN PATENTS

| | | |
|---|---|---|
| 1,155,377 | France | Nov. 25, 1957 |